P. E. SMITH, S. R. SPRUILL & W. R. WOOD.
ELECTRIC LIGHT BUOY.
No. 184,553. Patented Nov. 21, 1876.
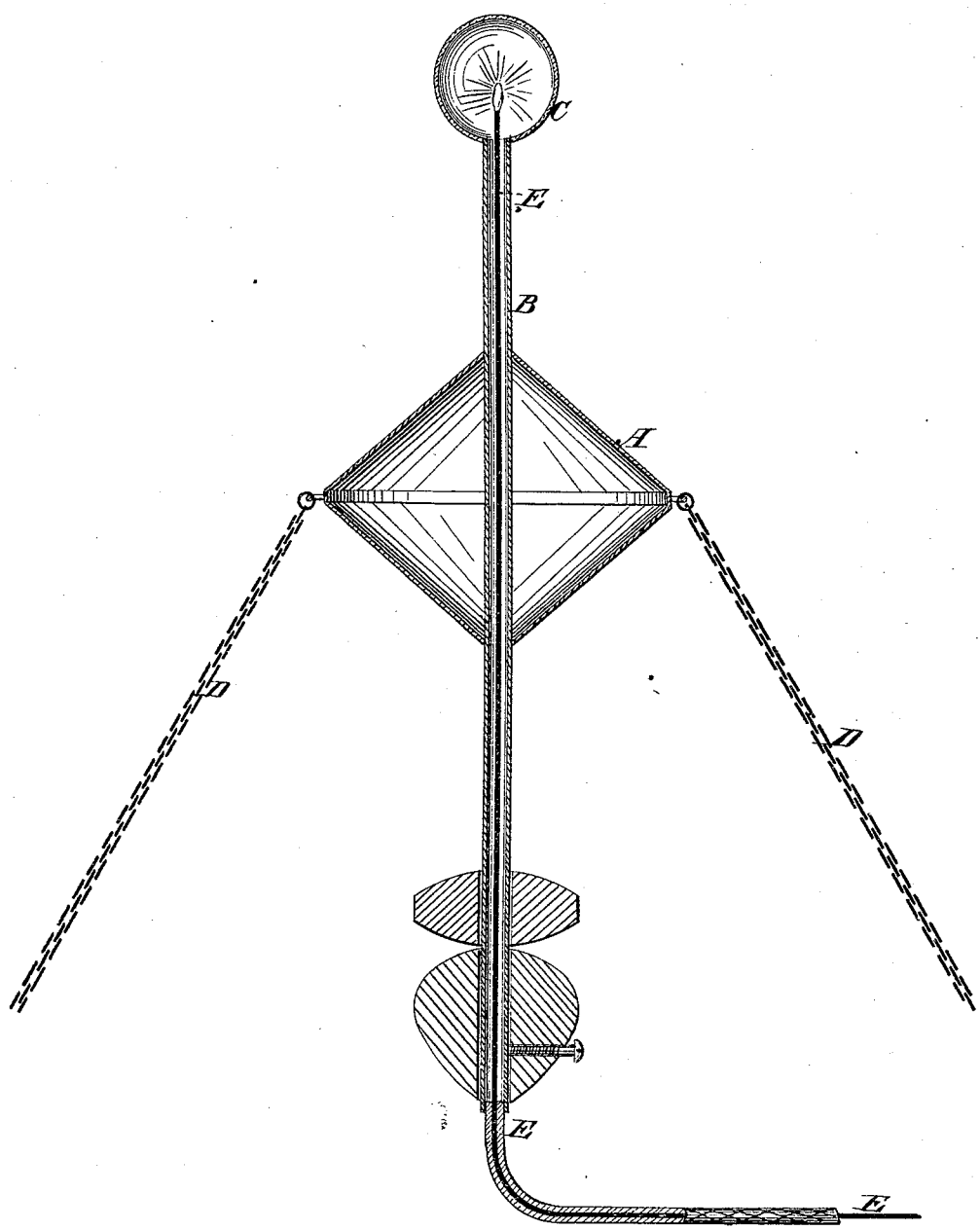
WITNESSES:
Francis McArdle.
John Goethals
INVENTOR:
P. E. Smith
S. R. Spruill
BY W. R. Wood
ATTORNEYS.

UNITED STATES PATENT OFFICE.

PETER E. SMITH, SHEPHERD R. SPRUILL, AND WILLIAM R. WOOD, OF SCOTLAND NECK, NORTH CAROLINA.

IMPROVEMENT IN ELECTRIC-LIGHT BUOYS.

Specification forming part of Letters Patent No. 184,553, dated November 21, 1876; application filed September 9, 1876.

*To all whom it may concern:*

Be it known that we, PETER E. SMITH, SHEPHERD R. SPRUILL, and WILLIAM R. WOOD, of Scotland Neck, county of Halifax and State of North Carolina, have invented a new and Improved Electric-Light Buoy, of which the following is a specification:

The figure is a vertical section of our improved buoy.

The object of this invention is to enable the mouths of rivers and harbors to be entered, shoals to be avoided, and other dangerous places to be navigated at night as well as day.

The invention consists in the combination of a tube, a glass globe, and an electric cable, with a buoy provided with two anchors, ropes, or chains, to form a floating electric gas carbon light, as hereinafter fully described.

Similar letters of reference indicate corresponding parts.

A is a buoy, which may be made of any desired size, and formed to rise more or less out of the water, as may be desired, though in general we prefer to have them low or close to the surface of the water. B is a tube, which passes vertically through the center of the buoy A, the connection being made watertight. C is a glass globe, which is secured air-tight to the upper end of the tube B. D are the ropes or chains by which the buoy is anchored, two of which are used to prevent the buoy from being turned around by the ebb and flow of the tide, and twisting or injuring the cable E.

Gas carbon is placed in the glass globe C and charged with electricity through a submarine cable, E, that leads to the shore, a light-house, or other convenient place.

The cable E must be insulated from and must have a water-tight connection with the tube B. The tube B projects above the buoy A to support the glass globe C, and below the said buoy to serve as ballast to the device. The anchor ropes or chains D must be of such a length as to allow the buoy to rise and fall with the tide, and the cable E must have sufficient slack to allow the said buoy to swing with the tide without straining the said cable. In this way buoys may be lighted up at night, so that vessels may enter the mouths of rivers and harbors at night as well as by day, and even in foggy weather, as the light produced in this way is more intense and penetrating than ordinary lights.

Having thus described our invention, we claim as new, and desire to secure by Letters Patent—

The combination of a tube, B, glass globe C, and electric cable E, with a buoy, A, provided with two anchor ropes or chains, D, to form a floating electric gas carbon light, substantially as herein shown and described.

SHEPHERD R. SPRUILL.
WILLIAM R. WOOD.
PETER E. SMITH.

Witnesses for SMITH:
JAMES T. GRAHAM,
C. SEDGWICK.

Witnesses for SPRUILL and WOOD:
JOHN H. EVERETT,
JAMES C. HILL.